United States Patent
Escher et al.

(10) Patent No.: US 9,630,480 B2
(45) Date of Patent: Apr. 25, 2017

(54) WIND DEFLECTOR FOR A VEHICLE

(71) Applicant: Daimler AG, Stuttgart (DE)

(72) Inventors: Uwe Escher, Ehningen (DE); Juergen Luka, Tamm (DE); Martin Maihoefer, Altdorf (DE); Volker Schwarz, Ebersbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/909,731

(22) PCT Filed: Jul. 26, 2014

(86) PCT No.: PCT/EP2014/002042
§ 371 (c)(1),
(2) Date: Feb. 2, 2016

(87) PCT Pub. No.: WO2015/018502
PCT Pub. Date: Feb. 12, 2015

(65) Prior Publication Data
US 2016/0185198 A1    Jun. 30, 2016

(30) Foreign Application Priority Data
Aug. 3, 2013    (DE) .................. 10 2013 012 969

(51) Int. Cl.
*B60J 7/22*        (2006.01)
*B60J 10/82*    (2016.01)
*B62D 35/00*    (2006.01)

(52) U.S. Cl.
CPC .............. *B60J 7/22* (2013.01); *B60J 10/82* (2016.02); *B62D 35/00* (2013.01)

(58) Field of Classification Search
CPC ... B60J 7/22; B60J 7/043; B60J 10/82; B62D 35/00

USPC ............................................. 296/180.1, 217
See application file for complete search history.

(56) References Cited

U.S. PATENT DOCUMENTS

2007/0216194 A1*  9/2007  Rober ................ B62D 35/005
                                                                  296/180.1

FOREIGN PATENT DOCUMENTS

| DE | 197 50 218 A1 | 5/1999 |
| DE | 102 46 753 A1 | 4/2004 |
| DE | 10 2008 036 887 A1 | 2/2010 |
| DE | 10 2008 058 159 A1 | 5/2010 |

OTHER PUBLICATIONS

PCT/EP2014/002042, International Search Report (PCT/ISA/220 and PCT/ISA/210) dated Oct. 8, 2014, with partial English translation, enclosing Written Opinion of the International Searching Authority (PCT/ISA/237) (Twelve (12) pages).

* cited by examiner

*Primary Examiner* — Joseph D Pape
(74) *Attorney, Agent, or Firm* — Crowell & Moring LLP

(57) ABSTRACT

A wind deflector for a vehicle is disclosed. The wind deflector includes at least one housing element, at least one deflector element which is at least partially received in the housing element, at least one actuator via which the deflector element is able to move in a linearly oscillating manner relative to the housing element in at least one spatial direction, and at least one sealing element via which the deflector element is sealed at least in one partial region against the housing element. The sealing element is formed as a flexible membrane which is arranged on the one hand on the housing element and on the other hand on the deflector element to be able to move with this.

8 Claims, 13 Drawing Sheets

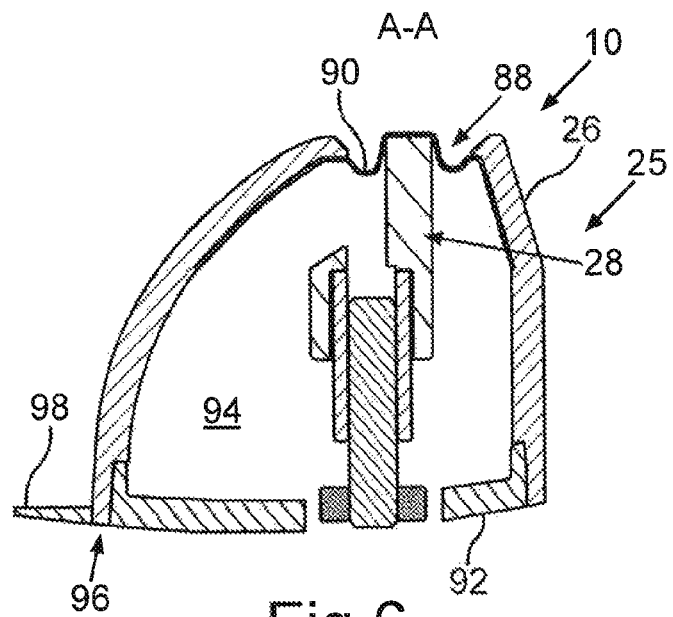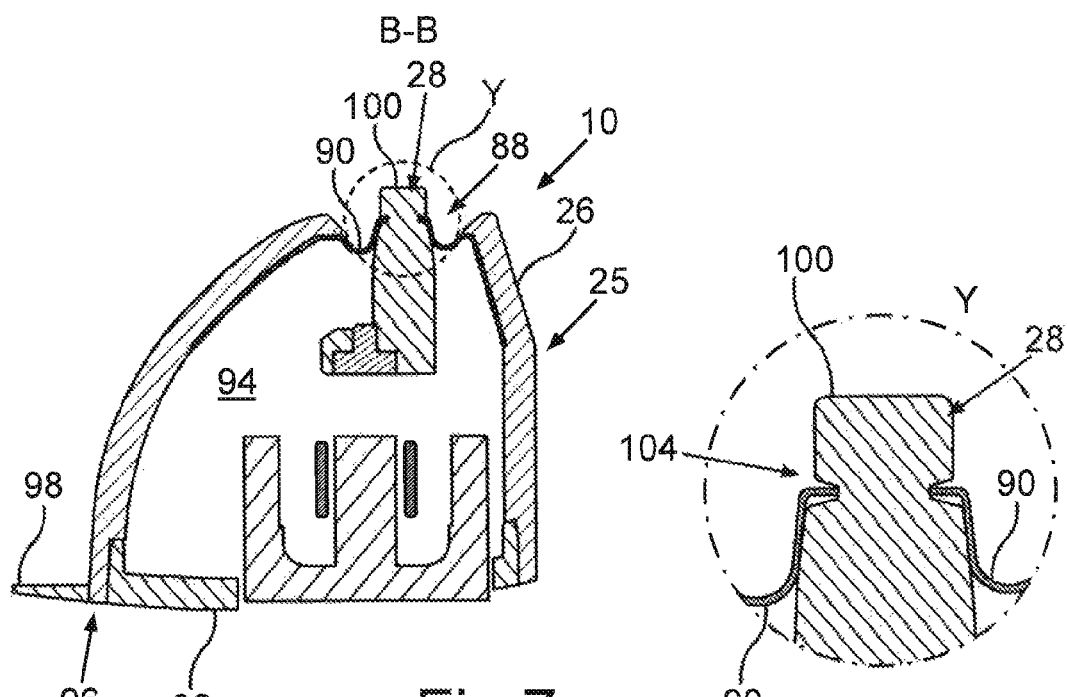

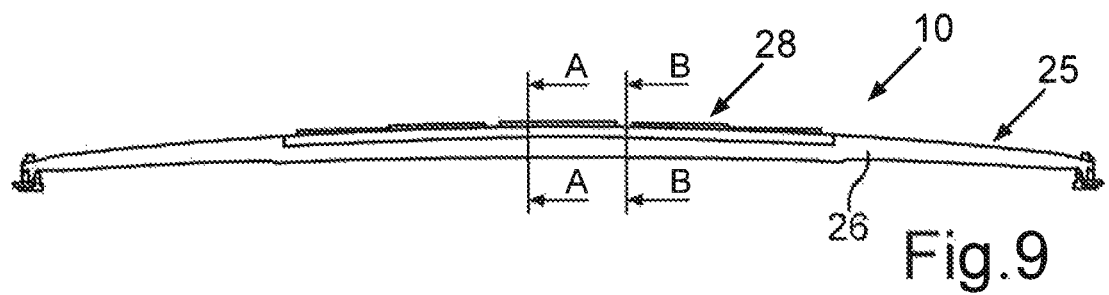
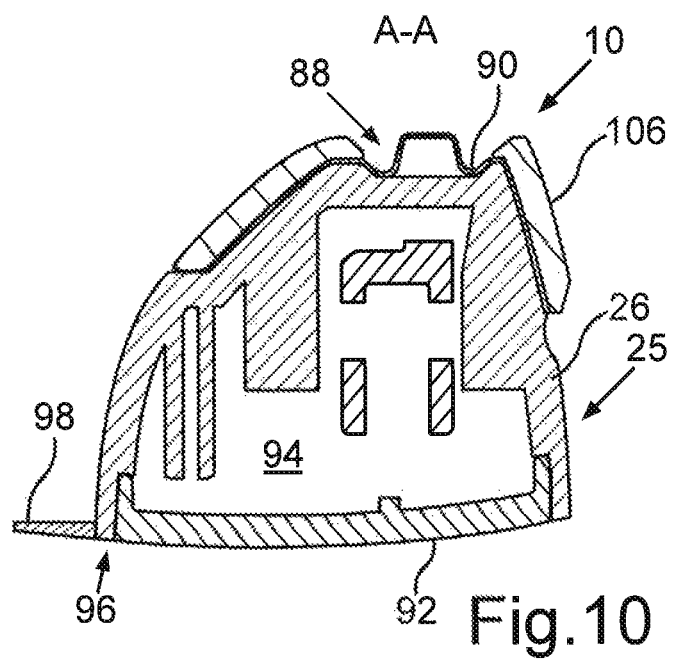

WIND DEFLECTOR FOR A VEHICLE

BACKGROUND AND SUMMARY OF THE INVENTION

The invention relates to a wind deflector for a vehicle.

Motor vehicles are known from series vehicle construction which have a fixed vehicle roof with at least one openable roof element. The openable roof element is usually referred to as a cover and is able to be shifted between a closed position which closes a roof opening and at least one open position which releases the roof opening at least partially. Here, the cover is allocated, for example, to a sliding and/or lifting roof, wherein the cover can be moved in the vehicle longitudinal direction and/or shifted in the vehicle vertical direction.

During vehicle operation, the released roof opening is flown over by air. It has thereby been shown that—if no corresponding counter measures are taken—a humming which is unpleasant for vehicle passengers can occur in the interior of the vehicle. The humming results due to periodic instabilities and pressure fluctuations in the shear layer flowing over the roof opening, which leads to a periodic pressure compensation in the interior. Such a humming can impair the driving comfort when the roof element is open.

DE 197 50 218 C2 discloses a method for suppressing periodic pressure changes in a cavity, for example an interior of a vehicle, which is flowed around by an external flow and is provided with an opening. It is thereby provided that a change of the flow direction of the external flow which is opposed to the current pressure change in the inside of the cavity is caused periodically and in phase. The change of the flow direction can thereby occur directly, for example using deflector wings, or indirectly, for example by transverse flow induced in proximity to the opening front edge.

A wind deflector for a vehicle is gleaned as known from DE 10 2008 036 887 A1. The wind deflector comprises at least one housing element and at least one deflector element, which is received at least partially in the housing element. Furthermore, the wind deflector comprises at least one actuator by means of which the deflector element is able to move in a linearly oscillating manner in at least one spatial direction relative to the housing element. Additionally, at least one sealing element is provided, by means of which the deflector element is sealed at least in a partial region against the housing element.

The object of the present invention is to create a wind deflector for a vehicle, by means of which humming noises in the interior of the vehicle can be kept particularly low when the roof opening is released.

In order to create a wind deflector for a vehicle, in particular a motor vehicle, by means of which humming noises in the interior of the vehicle can be kept particularly low, it is provided according to the invention that the sealing element is formed as a flexible membrane, which is arranged on the one hand on the housing element and on the other hand on the deflector element and is able to move with this. This means that the flexible membrane is moved during the oscillating movement of the deflector element. The deflector element can also be sealed particularly well against the housing element by means of the membrane such that unfavorable air flows can be prevented or at least kept low. It is thereby possible to influence the air flow in a targeted manner using the oscillating movement of the deflector element and to be able to induce disruptions in the air flow. Excessive, unpleasant humming which results from a periodic pressure compensation in the interior can hereby be prevented.

In particular, it is possible to clearly reduce the humming level in the interior in the speed range from 30 kilometers per hour to 80 kilometers per hour, flow noises at higher speeds as well as tension effects in the interior when sliding roofs are open. As acoustic resonances in the passenger compartment, which is opened when the sliding roof is open, can be reduced by means of the wind deflector according to the invention, very extensive roof openings to be opened can be achieved without an undesired impairment of the vehicle comfort occurring when these roof openings are released.

In a particularly advantageous embodiment of the invention, the deflector element is mounted on the housing element via the flexible membrane. The construction space requirement, the parts number and the weight of the wind deflector can hereby be kept low as the flexible membrane fulfils a double function. On the one hand, the flexible membrane serves to seal the deflector element against the housing element. On the other hand, the flexible membrane serves to mount the deflector element, wherein this is held on the housing to be able to move relative to this via the membrane.

A further embodiment is distinguished in that the inherently rigid housing element is formed from a first plastic. The flexible membrane is thereby formed from a second plastic which differs from the first plastic and is injection molded onto the housing element. Here, the wind deflector is at least partially formed as a two-component plastic component, wherein the housing represents a first plastic component and the flexible membrane represents a second plastic component of the two-component plastic component. A simple and cost-effective production is hereby able to be achieved. Furthermore, the housing element and the flexible membrane can hereby be adapted to their respective tasks. On the one hand, the housing element can be formed to be stiff and stable; on the other hand, the flexible membrane can be formed to be particularly soft or flexible, i.e., for example flaccid or moldable. Therefore, the flexible membrane can ensure an advantageous sealing and at the same time can move with the deflector element.

It has been shown to be particularly advantageous if at least one cover element formed from a first plastic is provided on which the flexible membrane formed from a second plastic which differs from the first plastic is injection molded. The housing element is thereby at least partially covered by the cover element arranged on the housing element. In other words, a component is provided which comprises the cover element and the flexible membrane and can be produced independently from the housing element and can be fastened to the housing element as a produced component. A time- and cost-effective production as well as a simple assembly of the wind deflector are hereby able to be achieved.

To achieve a particularly firm connection, it can be provided that the cover element is connected to the housing element which is preferably likewise formed from a plastic by friction welding.

In the case of a further advantageous embodiment of the invention it is provided that the flexible membrane and the deflector element are connected positively to each other. A firm connection which is simple to produce is hereby able to be achieved.

A further embodiment is distinguished in that at least one sealing lip is provided on the housing element to seal the housing element against a structure of the vehicle. The structure is, for example, the shell or the body of the vehicle. Unfavorable, undesirable air flows can be prevented by this sealing.

To achieve a particularly good sealing effect, the lip is preferably formed from a plastic and is injection molded onto the housing element in the scope of an injection molding process.

In order to be able to deflect or influence the air flowing onto the deflector element, in particular during a forward drive of the vehicle, in a particularly advantageous manner, in a further embodiment of the invention it is provided that the deflector element comprises a base body and at least one deflector lip which is formed separately from the base body and is connected to the base body, wherein the deflector lip is arranged above the base body in the vehicle vertical direction. For example, a particularly firm connection of the flexible membrane to the deflector element which is simple to produce can also hereby be produced in such a way that the flexible membrane is clamped between the base body and the deflector lip which is inserted into the base body.

In a further advantageous embodiment of the invention, the deflector lip is connected to the base body in a positive and/or frictional manner. A particularly firm hold is hereby ensured such that the deflector lip does not release from the base body even in the event of high vehicle speeds.

Finally, it has been shown to be particularly advantageous if the flexible membrane is formed in one piece with the deflector lip. The parts number can hereby be kept particularly low. Additionally, a particularly simple production of the wind deflector is able to be achieved, as the connection of the flexible membrane to the deflector element or to the base body accompanies the connection of the deflector lip to the base body.

Further advantages, features and details of the invention result from the following description of preferred exemplary embodiments as well as by means of the drawings.

BRIEF DESCRIPTION OF THE DRAWINGS

FIG. 6 is a schematic sectional view through the wind deflector according to the second embodiment along an intersecting line A-A shown in FIG. 5;

FIG. 7 is a schematic sectional view through the wind deflector according to the second embodiment according to an intersecting line B-B shown in FIG. 5;

FIG. 8 is a schematic, enlarged depiction of a region of the wind deflector according to the second embodiment, referred to in FIG. 7 with Y;

FIG. 9 is a schematic front view onto the wind deflector according to a third embodiment;

FIG. 10 is a schematic sectional view through the wind deflector according to the third embodiment along an intersecting line A-A shown in FIG. 9;

DETAILED DESCRIPTION OF THE DRAWINGS

Figure 1:
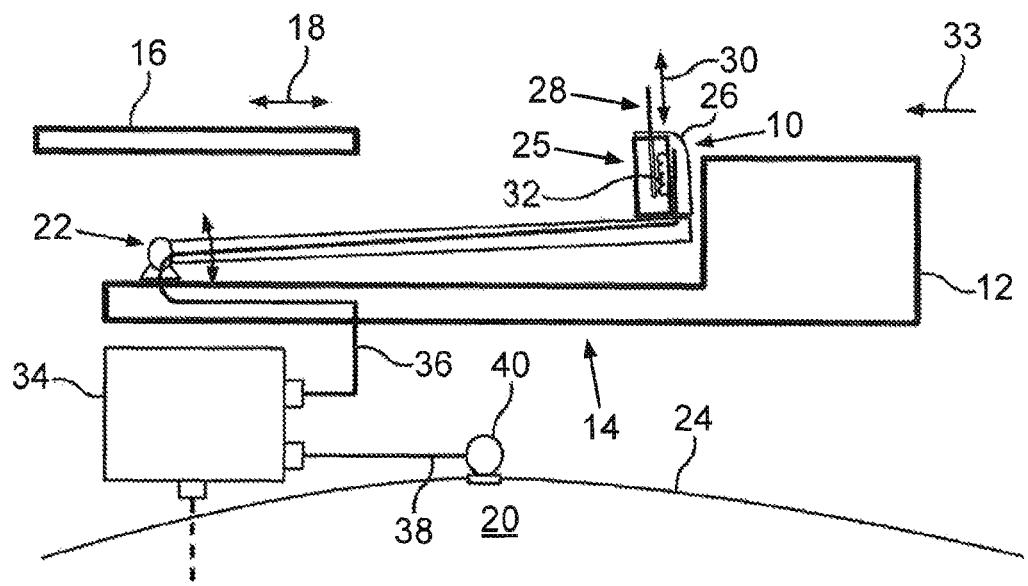
FIG. 1 is a schematic longitudinal cut view through a wind deflector according to a first embodiment for a vehicle in the form of a passenger motor vehicle, wherein the wind deflector comprises a housing element, a deflector element which is received at least partially in the housing element, at least one actuator to move the deflector element relative to the housing element as well as a sealing element which is formed as a flexible membrane which is arranged on the one hand on the housing element and on the other hand on the deflector element to be able to move with this.

In the Figures, identical or functionally identical elements are provided with the same reference numerals.

FIG. 1 shows a wind deflector 10 according to a first embodiment for a vehicle in the form of a passenger vehicle in a schematic longitudinal sectional view. The wind deflector 10 is—as is explained in more detail below—formed as an active wind deflector.

The passenger motor vehicle comprises a solid roof which has a roof frame 12 depicted in FIG. 1 particularly schematically. A roof opening 14 of the roof is limited by the roof frame 12. A sliding and/or lifting roof is allocated to the roof opening 14, which comprises a cover 16 which is able to move relative to the roof frame 12 at least in the vehicle longitudinal direction. This ability to move of the cover 16, which is formed as a glass cover, is illustrated in FIG. 1 by a double arrow 18. The cover 16 can therefore be moved between a closed position which closes the roof opening 14 and at least one open position which releases the roof opening 14 at least partially in the vehicle longitudinal direction, wherein the cover 16 is located in its open position in FIG. 1. In this opened state of the cover 16 or of the sliding roof, the interior 20 of the passenger motor vehicle is opened via the roof opening 14.

If the cover 16 is opened and the passenger motor vehicle drives forwards, then the roof opening 14 and therefore the interior 20 provided with the roof opening 14 is flowed around by an external flow in the form of an air flow. In FIG. 1, the flow direction of this external flow is illustrated by a directional arrow 33.

The wind deflector 10 is held to be pivotable around a pivot axis relative to the roof frame 12 via at least one joint 22 on the roof frame 12. When the cover 16 is open, the wind deflector 10 is pivoted upwards in the vehicle vertical direction from its storage position into its protective position. This movement occurs, for example, by means of at least one drive element, in particular a spring, and/or a motor. The movement of the wind deflector 10 can also occur via a coupling device, via which the wind deflector 10 is coupled to a drive, in particular a motor, to drive the cover 16. The movement of the cover 16 and the movement of the wind deflector 10 are thereby caused by means of the one motor.

In FIG. 1, a roof liner 24 of the passenger motor vehicle can also be recognized. The shell of the passenger motor vehicle is cased in particular in the region of the roof towards the interior 20.

As is recognizable from FIG. 1, the wind deflector 10 comprises a housing 25 having at least one housing element 26 as well as at least one deflector element 28 which can be formed, for example, as a lip or lamella or can comprise at least one lip and/or at least one lamella. As is illustrated in FIG. 1 by a double arrow 30, the deflector element 28 is able to move in a linearly oscillating manner relative to the housing element 26 in at least one spatial direction. The spatial direction can thereby coincide with the vehicle vertical direction or run diagonally to the vehicle vertical direction and to the vehicle longitudinal direction.

The wind deflector 10 also comprises at least one actuator 32, by means of which the deflector element 28 is able to move in a linearly oscillating manner relative to the housing element 26 in the spatial direction. In other words, the actuator 32 can drive the deflector element 28 and it thereby moves along the spatial direction. This spatial direction is therefore a movement direction, along which the deflector element 28 can be moved.

The wind deflector 10 also comprises a sealing element, which is not depicted in FIG. 1 and which is formed as a flexible membrane. The flexible membrane is thereby on the one hand arranged on the housing element 26 and on the other hand on the deflector element 28, such that the flexible membrane is moved in the case of a movement of the deflector element 28 caused by the actuator 32.

In FIG. 1, a control device 34 of the wind deflector 10 can also be recognized. The actuator 32 is regulated by means of the control device 34. For this purpose, the control device 34 is coupled to the actuator 32 via at least one electrical line in the form of a cable 36. Control or regulation signals can be transmitted from the control device 34 to the actuator 32 and received by the actuator 32 via the cable 36. Furthermore, it is possible that corresponding signals are transmitted to the control device 34 from the actuator 32 via the cable 36 such that the control device 34 obtains information concerning the respective current state of the actuator 32. In FIG. 1, for example, the current supply of the control device 34 is illustrated by a dashed line.

The control device 34 is coupled to a sensor 40 via a further electrical line in the form of a cable 38 to detect at least one fluidic parameter in the interior 20. The sensor 40 is, for example, a microphone to detect a pressure prevailing in the interior 20 as the parameter. The microphone is directed towards the interior 20. Alternatively or additionally, the sensor 40 can serve to detect a flow speed in the interior 20. The fluidic parameter detected by means of the sensor 40 is transmitted to the control device 34 via the cable 38 such that the actuator 32 can be regulated by the control device 34 depending on the fluidic parameter.

If no corresponding counter measures are taken, a humming or humming noises can occur in the interior 20 when the cover is open 16. These humming noises are characterized by the fluidic parameter or can be detected via the fluidic parameter. The sensor 40 therefore serves as a sensor to detect the humming noises, wherein a signal characterizing the humming noises is transmitted via the cable 38 to the control device 34 and the actuator 32 is driven or regulated depending on the signal.

As the actuator 32 is regulated by means of the control device 34 depending on the fluidic parameter, the linearly oscillating movement of the deflector element 28 caused by the actuator 32 also occurs depending on the fluidic parameter and therefore on the humming noises. Therefore, the humming noises can be counteracted by corresponding linearly oscillating movement of the deflector element 32, as the linearly oscillating movements can be adapted to the humming noises.

It is therefore possible by means of the sensor 40 to detect pressure changes in the interior 20. The deflector element 28 is now moved via the actuator 32 in such a way that a change of the flow direction of the external flow which counteracts the current pressure change in the interior 20 which is detected by means of the sensor 40 is caused periodically and in phase. Due to this change of the flow direction, periodic pressure changes and the humming noises resulting therefrom can be suppressed. The sealing of the deflector element 28 against the housing element 26 by means of the flexible membrane thereby ensures particularly favorable flow conditions such that a particularly low-noise drive can be achieved with an opened roof 16.

Figure 2A:
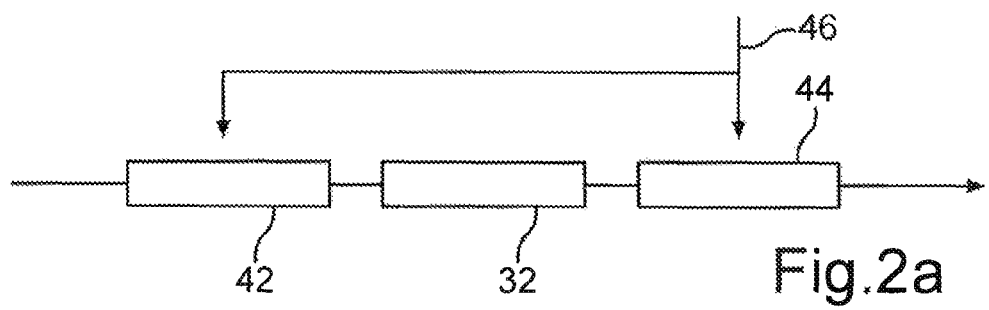
FIG. 2a is a schematic depiction of a feed-forward regulation to regulate the wind deflector.

A so-called feed-forward regulation of the actuator 32 and therefore of the deflector element 28 is illustrated by means of FIG. 2a. The feed-forward regulation comprises a regulator 42, the actuator 32 and an acoustic path 44, wherein one or more interference signals are supplied to the regulator 42 and the acoustic path 44. This is illustrated by directional arrows 46.

Figure 2B:
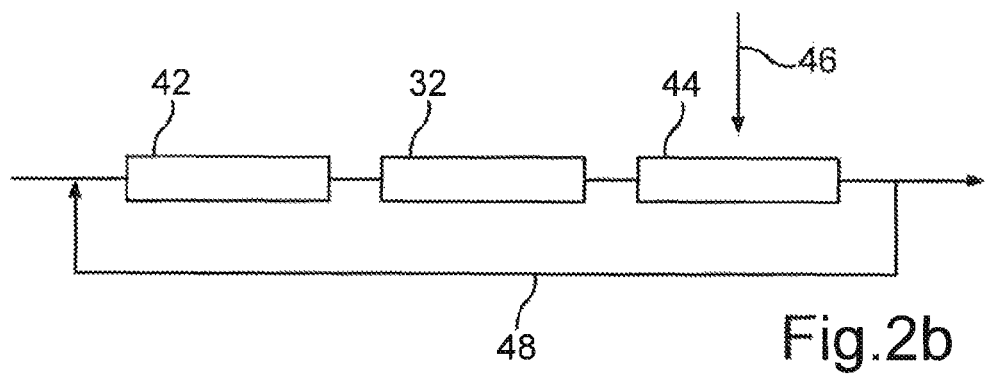
FIG. 2b is a schematic depiction of a feed-backward regulation to regulate the wind deflector.

A feed-backward regulation is illustrated by means of FIG. 2b which comprises the regulator 42, the actuator 32 and the acoustic path 44. One or more interference signals are supplied to the acoustic stretch 44, which is illustrated by means of the directional arrow 46. Furthermore, a feedback of the regulator output occurs which is illustrated in FIG. 2b by a directional arrow 48.

Optionally, at least one phase shifter and/or at least one filter can be provided, wherein the phase shifter and/or the filter can be implemented in either an analogue or digital manner.

The filter can thereby also be integrated into the sensor 40 to detect the humming noises. A CAN-BUS connection of the control device 34 is advantageous to adapt the regulation parameter to the respective drive state, which is likewise illustrated via the dashed line in FIG. 1. Vehicle-specific parameters can be tapped via the CAN-BUS and can be processed in the regulation or in the regulator 42. The interference signals can be eliminated in the scope of the feed-forward or feed-backward regulation, wherein the interference signals can be either directly received or detected signals or signals supplied via the CAN-BUS.

Instead of regulation, electronic control of the actuator 32 and therefore of the deflector element 28 can also be provided. Electronic control and/or regulation with a characteristic curve-controlled or characteristic diagram-controlled output signal is thereby conceivable. In this scope, for example, vehicle data can be processed from different BUS networks. In this case, an analogue and/or digital signal processing can occur in the control device 34. Furthermore, the use of at least one microcontroller, or of a digital signal processor and/or ASIC (Application-specific integrated Circuit) is possible. The filtering of the interference signals from the environment of the passenger motor vehicle and/or from the interior 20 which can impair the detection of the humming noises can occur in an analogue and/or digital manner, i.e. by means of an analogue and/or digital filter. Furthermore, a diagnosis of error functions and the control of the actuator 32 can be provided.

Different installation sites are conceivable with regard to the sensor 40, for example formed as a microphone. The sensor 40 can, for example, be arranged in the roof liner 24 or in a roof operating unit, via which the vehicle passengers can operate the adjustment of the cover 16. A sensor can be used to detect the humming signals accurately. Alternatively to this, the use of several sensors is conceivable to detect the humming noises.

Figure 3:
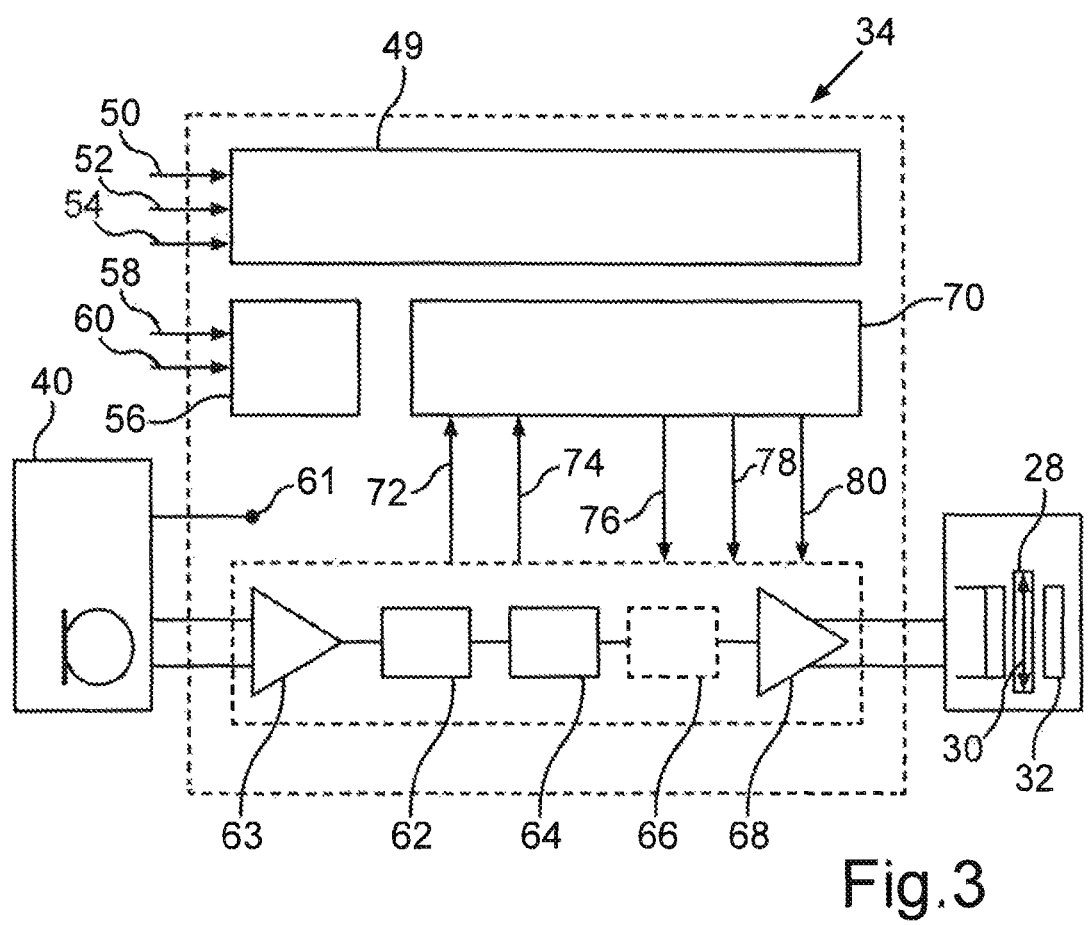
FIG. 3 is a schematic depiction of a control device to regulate the wind deflector.

FIG. 3 shows a block diagram of the control device 34. The control device 34 comprises a voltage supply 49 having a terminal 15 connection 50, a terminal 30 connection 52 and a terminal 31 connection 54. Additionally, the control device 34 comprises a CAN module 56 having a CAN-High connection 58 and a CAN-Low connection 60, via which the control device 34 can be connected to the CAN-BUS of the passenger motor vehicle. The sensor 40 formed as a microphone, which is supplied with energy via a supply connection 61, in particular electrical current, is also recognizable in FIG. 3. Furthermore, the sensor 40 is connected to an amplifier 63 of the control device 34, by means of which the signal characterizing the humming noises and provided by the sensor 40 and transferred to the control device 34 is amplified. The signal is finally filtered by means of a low-pass filter 62 and an all-pass filter 64 and can be limited by means of a limiter 66. Finally, it is amplified by a further amplifier 68, whereupon it is transferred as a control signal or regulating signal to the actuator 32.

To generate the control signal, the control device 34 comprises a microcontroller 70 to which at least one diagnosis signal 72 as well as the signal of the sensor 40 referred to with 74 is supplied. The microcontroller 70 provides the phase 76 and the amplification 78 as well as a switch-on and switch-off signal 80 such that the regulation of the actuator 32 thereby occurs. The deflector element 28 can thereby be moved in a linearly oscillating manner actively and in a targeted manner by means of the actuator 32, depending on the humming noises detected by means of the sensor 40.

Figure 4A:
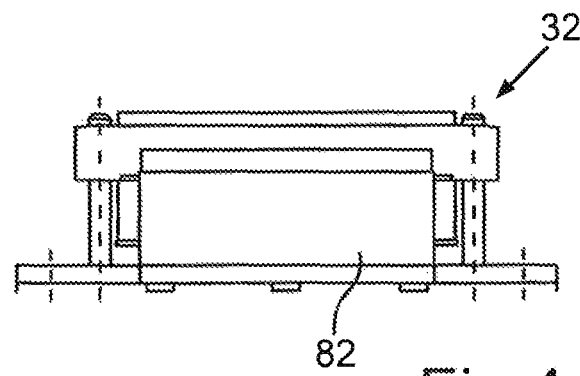
FIG. 4a is a schematic front view onto the actuator which is formed as an electrodynamic actuator.
Figure 4B:
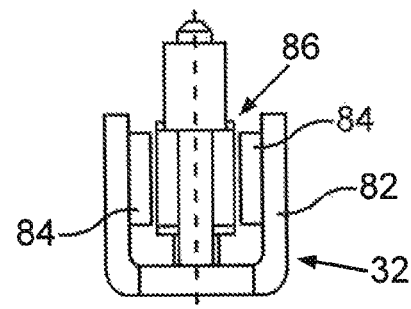
FIG. 4b is a schematic side view onto the actuator.
Figure 4C:
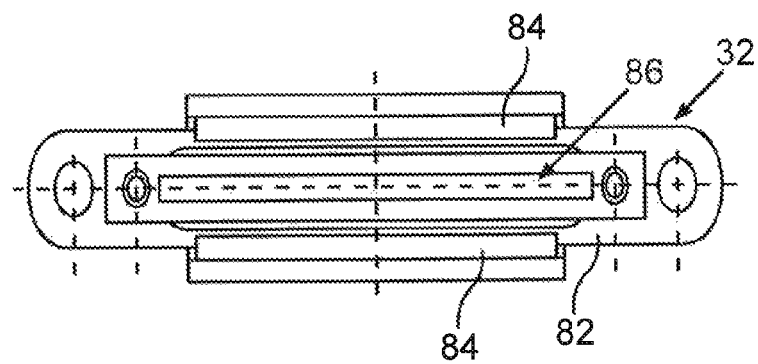
FIG. 4c is a schematic top view onto the actuator.
Figure 5:
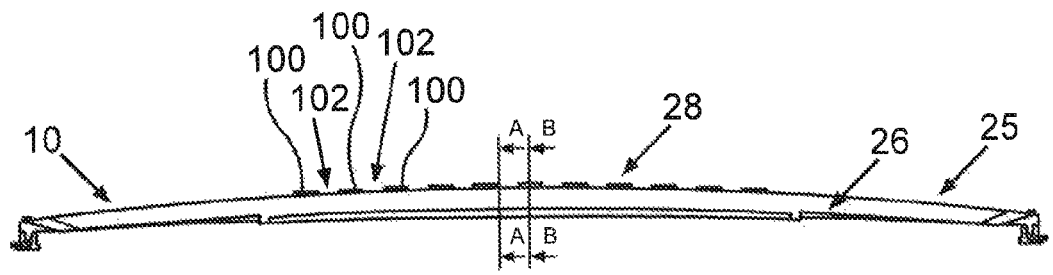
FIG. 5 is a schematic front view onto the wind deflector according to a second embodiment.
Figure 11:
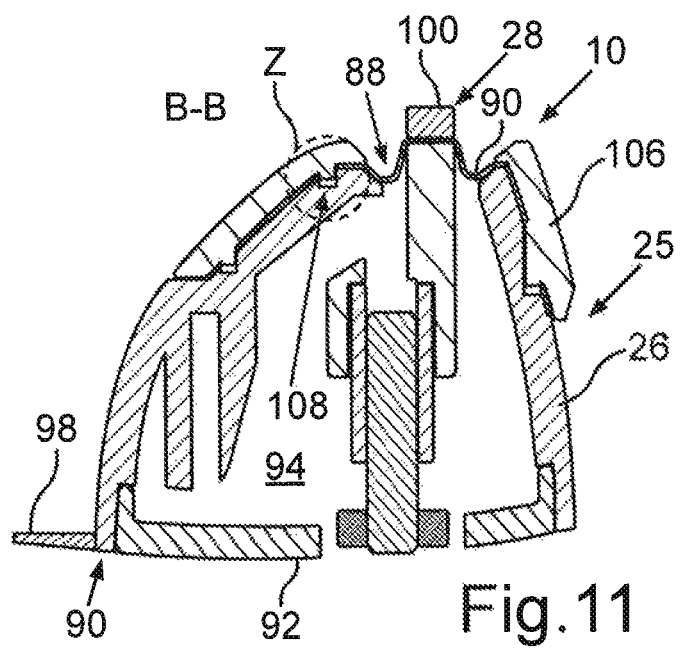
FIG. 11 is a schematic sectional view through the wind deflector according to the third embodiment along an intersecting line B-B shown in FIG. 9.
Figure 12:
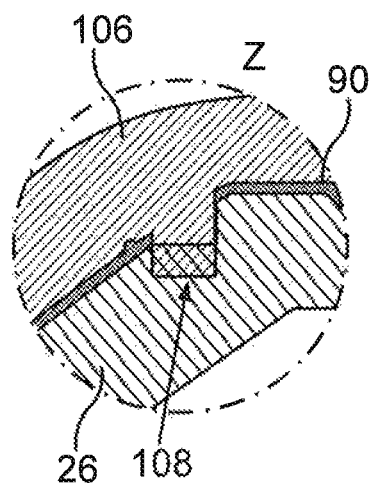
FIG. 12 is a schematic and enlarged depiction of a region of the wind deflector according to the third embodiment, referred to in FIG. 11 with Z.
Figure 13:
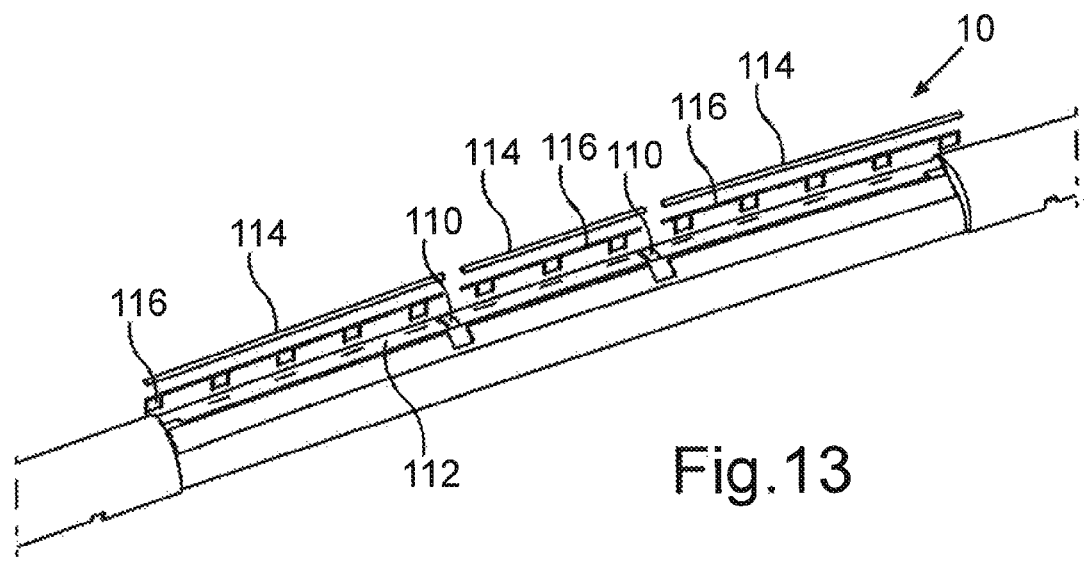
FIG. 13 is a schematic exploded depiction of the wind deflector according to a fourth embodiment.
Figure 14:
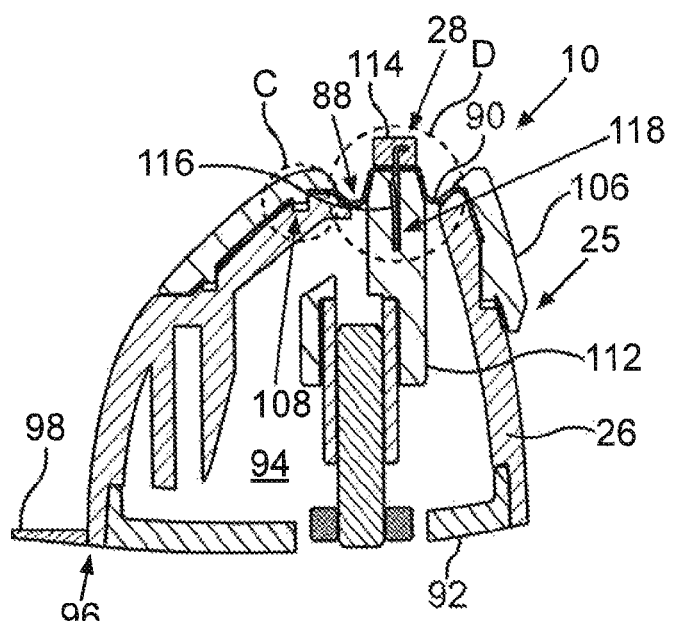
FIG. 14 is a schematic cross-sectional view through the wind deflector according to the fourth embodiment.
Figure 15:
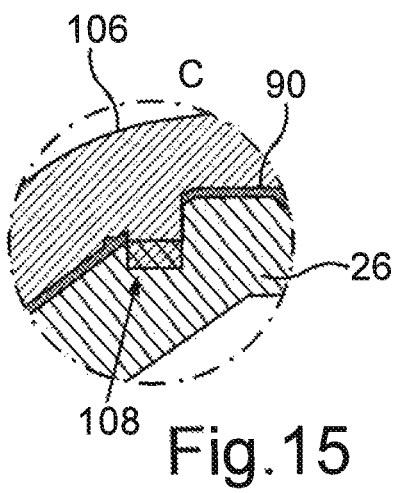
FIG. 15 is a schematic and enlarged depiction of a region referred to in FIG. 14 with C.
Figure 16:
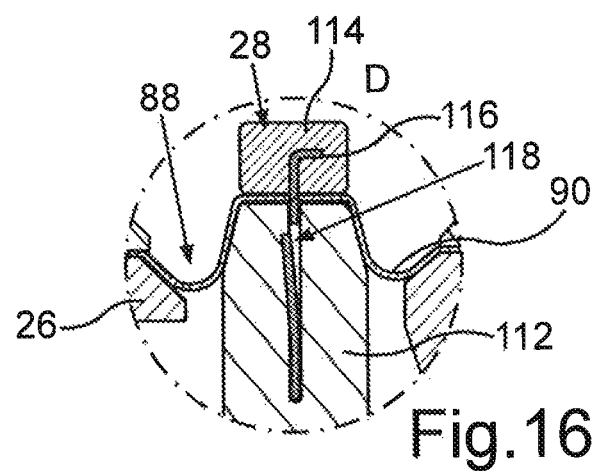
FIG. 16 is a schematic and enlarged depiction of a region referred to in FIG. 14 with D.
Figure 17:
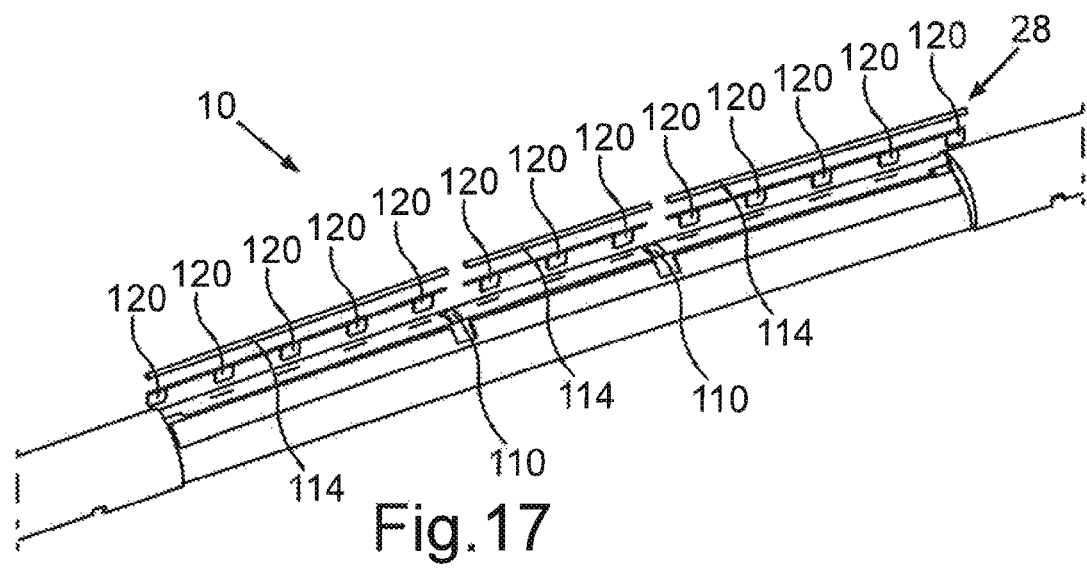
FIG. 17 is a schematic exploded depiction of the wind deflector of according to a fifth embodiment.
Figure 18:
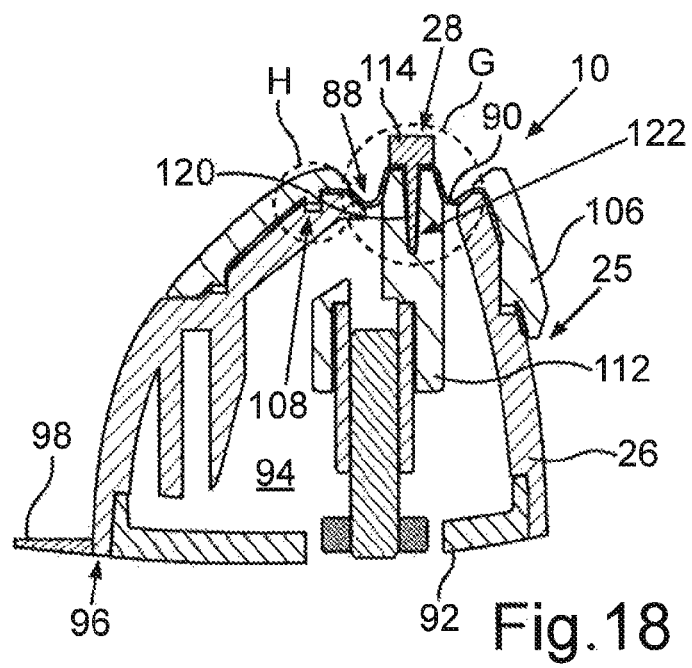
FIG. 18 is a schematic cross-sectional view through the wind deflector according to the fifth embodiment.
Figure 19:
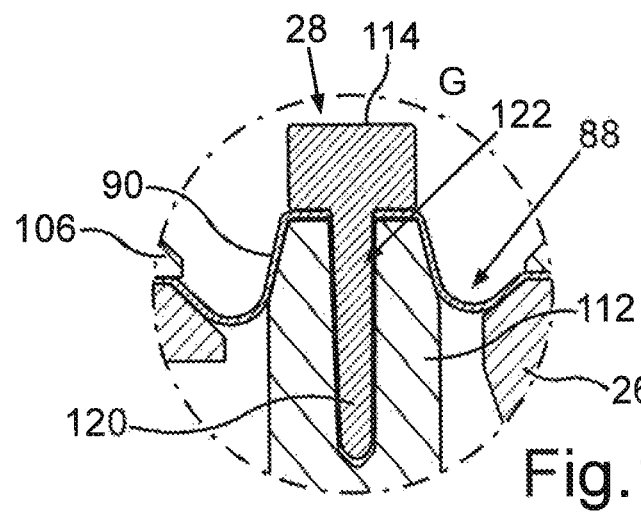
FIG. 19 is a schematic and enlarged depiction of a region referred to in FIG. 18 with G.
Figure 20:
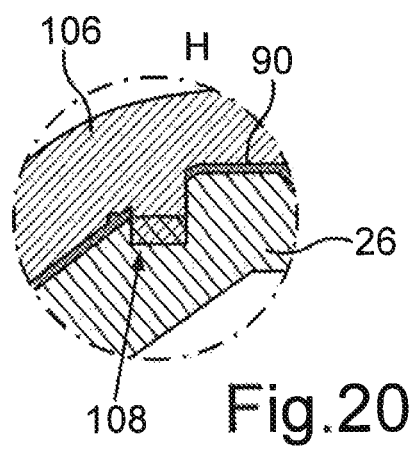
FIG. 20 is a schematic and enlarged depiction of a region referred to in FIG. 18 with H.

FIG. 4a-c show the actuator 32 which is formed as an electrodynamic actuator. The actuator 32 thereby comprises an iron core 82, permanent magnets 84 and a coil body 86 which is able to move along the movement direction relative to the iron core 82. The coil body 86 can thereby be coupled at least indirectly to the deflector element 28 such that the deflector element 28 is able to move in a linearly oscillating manner by means of the coil body 86.

The actuator 32 is therefore formed as a linear drive and has, for example, a lift of +/−2 millimeters such that the coil body 86 has in total a movement path of 4 millimeters. A force of, for example, approximately 3.5 Newtons can be applied to the deflector element 28 by means of the actuator 32.

Preferably, the coil body 86 is able to move relative to the iron core 82 with a frequency in a range from inclusive 15 Hertz to inclusive 25 Hertz such that the deflector element 28 can therefore also be moved in a linearly oscillating manner with a frequency in a range from inclusive 15 Hertz to inclusive 25 Hertz. The actuator 32 has, for example, an operating temperature range from −40° C. to inclusive +105° Celsius.

FIG. 5 to 8 show the wind deflector 10 according to a second embodiment. The housing element 26 is formed to be inherently rigid and from a first plastic in the form of a glass fibre-reinforced plastic. The housing element 26 hereby has a very high rigidity. The housing element 26 has a passage 88, via which the deflector element 28 can be driven out of the housing element 26 at least partially and can be driven into the housing element 26 at least partially. The flexible membrane, referred to in FIG. 6 with 90, is arranged in the region of the passage 88, using which flexible membrane the passage 88 is covered at least partially.

The flexible membrane 90 is thereby formed from an elastomer which differs from the first plastic. The flexible membrane 90 is thereby injection molded onto the housing element 26, in particular in the scope of an injection molding process. The housing element 26 and the flexible membrane 90 thereby form a two-component plastic component (2C injection molded part) which is produced in the scope of an injection molding process. A first component of the two-component plastic component is formed by the housing element 26, wherein a second component of the two-component plastic component is formed by the flexible membrane 90. The two components thereby have different rigidities. Whilst the housing element 26 is inherently rigid, the flexible membrane 90 is flaccid or moldable such that the membrane 90 held on the one hand on the housing element 26 and fastened on the other hand on the deflector element 28 is moved in the case of oscillating movements of the deflector element 28. As is recognizable from FIG. 6, the housing 25 comprises a housing lower part 92 connected to the housing element 26 such that a receiving space 94 of the wind deflector 10 is limited at least partially by the housing element 26 and the housing lower part 92.

As can be recognized particularly well from FIG. 6, the housing 25 is formed without sharp edges such that particularly favorable flow conditions can be created for the air flowing around the housing 25. The deflector element 28 is received at least partially in the housing 25 and serves to induce disruptions in the air flow.

As can be recognized from FIGS. 6 and 7, a front lower edge 96 of the housing element 26 is provided with a sealing lip 98, by means of which the wind deflector 10 is sealed to the shell of the passenger motor vehicle. The sealing lip 98 is likewise formed from an elastomer and can be injection molded onto the housing element 26 in the scope of the injection molding process, which is also referred to as a 2C method. As can be gleaned particularly well from FIG. 8 seen together with FIG. 5, the deflector element 28 and the flexible membrane 90 are connected to each other in a positive manner. For this purpose, the deflector element 28 has several crenellations 100 on its upper edge and crenels 102 arranged between the crenellations 100. The crenellations 100 are pressed or inserted through corresponding slots of the membrane 90 during the assembly of the wind deflector 10. Each of the crenellations 100 is provided with a circulating groove 104 (FIG. 8) with which the flexible membrane 90 engages after assembly. The groove 104 and the flexible membrane 90 hereby form a respective positive bond.

FIG. 9 to 12 show the wind deflector 10 according to a third embodiment. The housing element 26 is also formed in the third embodiment from a plastic in the form of a glass fibre-filled or glass fibre-reinforced plastic. The wind deflector 10 according to the third embodiment comprises a cover element 106 which is formed from a first plastic, for example from a thermoplastic plastic. The membrane 90 is now formed from a second plastic which differs from the first plastic of the cover element 106 and not, for example, as in the second embodiment, injection molded onto the housing element 26, but onto the cover element 106 in the scope of an injection molding process. A two-component plastic component is hereby formed by the flexible membrane 90 and the cover element 106 which can be produced independently of and therefore at least partially at the same time as the housing element 26.

In the scope of the production of the wind deflector 10, the cover element 106 is superimposed onto the housing element 26 with the membrane 90 injection molded thereon. From FIGS. 11 and 12 it can be particularly well recognized that the two-component plastic component having the cover element 106 and the membrane 90, in particular the cover element 106, is connected to the housing element 26 via respective connection regions 108. This connection preferably occurs by means of friction welding such that the cover element 106 having the membrane 90 is connected inseparably to the housing element 26.

As in the second embodiment, the front lower edge 96 of the housing element is provided with the sealing lip 98, wherein the sealing lip 98 is injection molded onto the housing element 26 in the scope of an injection molding process. A two-component plastic component is thereby also formed by the housing element 26 and the sealing lip 98, as the housing element 26 and the sealing lip 98 can be formed from plastics which differ from each other.

FIG. 13 to 16 show the wind deflector 10 according to a fourth embodiment. To achieve a high form stability of the wind deflector 10 and in particular of the housing element 26, presently two integrated bridges are used which are referred to as housing bridges 110. As can be recognized from FIG. 13, the passage 88 is bridged by these in the region of the housing bridge 110.

Three deflector lips 114 which are arranged in the longitudinal extension direction of the wind deflector 10 at a distance from one another and which form an overall lip are provided due to the housing bridges 110. In other words, this overall lip is implemented in three parts. Therefore, the housing bridges 110 can be arranged between the deflector lips 114 and the deflector lips 114 can be moved in a linearly oscillating manner next to the housing bridges 110 without a collision with the housing bridges 110 or a prevention of the linearly oscillating movement by the housing bridges occurring. The respective deflector lip 114 can be formed to be pointed, round and/or aerodynamic and can have any free form.

In the fourth embodiment, the deflector element 28 comprises at least one base body in the form of a lamella 112 as well as deflector lips 114 formed separately from the lamella 112 and connected to the base body (lamella 112), which are superimposed on the lamella 112 and are arranged above the lamella 112 in the vehicle vertical direction. In the fourth embodiment, claw plates 116 are used to fasten the deflector lips 114 to the lamella 112. The deflector lips 114 are thereby formed from a thermoplastic plastic. As can be recognised particularly well from FIG. 16, the deflector lips 114 are positively connected to the respective claw plate 116, wherein the respective claw plate 116 is inserted into a corresponding receiver 118 of the lamella 112. The respective claw plate 116 formed from a spring steel bonds with at least one wall of the lamella 112 which limits the respective receiver 118 such that the respective claw plate 116 is connected frictionally and/or positively to the lamella 112. It can thereby be provided that the respective deflector lip 114 is injection molded onto the respective claw plate 116 or that the respective claw plate 116 is at least partially insert molded by the respective deflector lip 114.

Due to this design of components produced separately from each other which are connected to each other after their production, for example plugged together, a modular construction is achieved. As a consequence, the wind deflector 10 can be produced and assembled in a simple manner.

FIG. 17 to 20 show the wind deflector 10 according to a fifth embodiment, wherein the deflector element 28 comprises the deflector lips 114. Springs 120 formed from a plastic are injection molded onto the deflector lips 114 formed from the thermoplastic plastic. The deflector lips 114 and the respective springs 120 can thereby be formed in one piece with each other such that the respective spring 120 can also be formed from a thermoplastic plastic. As is able to be recognized particularly well from FIGS. 18 and 19, the respective spring 120 is pressed into a respectively corresponding receiver 122 of the lamella 112. The receiver 122 is thereby formed to be at least substantially conical and tapers in the insertion direction in which the respective spring 120 is inserted into the corresponding receiver 122. In the present case, the receiver 122 tapers downwards in the vehicle vertical direction. Correspondingly, the respective spring 120 is therefore formed to be at least substantially conical, wherein the respective spring 120 tapers in the insertion direction.

During assembly of the wind deflector 10, the respective springs 120 are inserted through respectively corresponding slots of the flexible membrane 90. The flexible membrane 90 is therefore clamped, in the completely assembled state, between the respective deflector lip 114 and the lamella 112 such that the flexible membrane 90 is connected positively to the deflector element 28.

Figure 21:
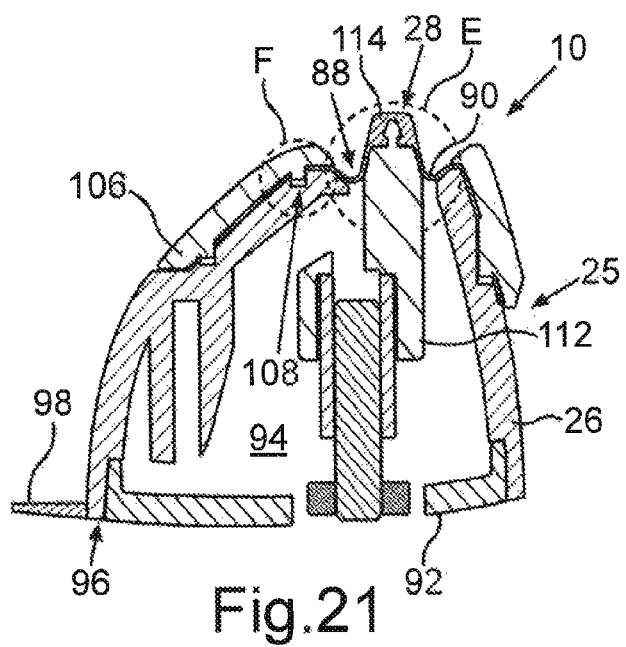
FIG. 21 is a schematic cross-sectional view through the wind deflector according to a sixth embodiment.
Figure 22:
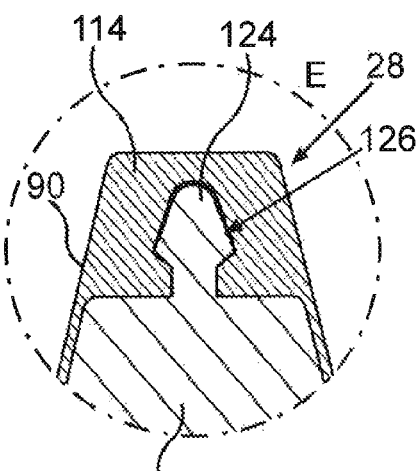
FIG. 22 is a schematic and enlarged depiction of a region referred to in FIG. 21 with E.
Figure 23:
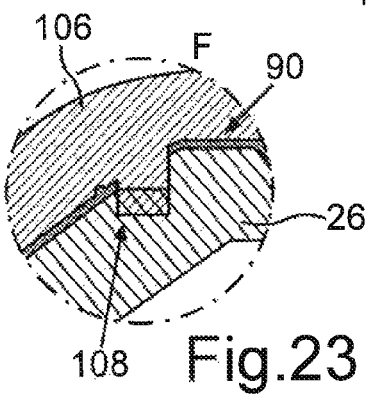
FIG. 23 is a schematic and enlarged depiction of a region referred to in FIG. 21 with F.

FIG. 21 to 23 show the wind deflector 10 according to a sixth embodiment. As in the fourth embodiment and in the fifth embodiment, the housing element 26 is formed to be inherently rigid and from a glass fibre-reinforced plastic. According to the sixth embodiment, the deflector element 28 comprises the at least one lamella 112 as well as at least one deflector lip 114 which is a component which is produced separately from the lamella 112 and is connected, in particular connected positively, to the lamella 112. The lamella 112 and the deflector lip 114 are preferably formed from plastics which differ from each other, wherein the deflector lip 114 can be softer than the lamella 112.

As is particularly well recognizable from FIG. 22, the deflector lip 114 which is superimposed onto the lamella 112 is integrated into the flexible membrane 90 or vice versa. In other words, the flexible membrane 90 is formed in one piece with the deflector lip 114 such that the flexible membrane 90 and the deflector lip 114 are formed from one elastomer. The connection of the deflector lip 114 and therefore of the flexible membrane 90 to the lamella 112 occurs via at least one and preferably more pins 124 which are at least substantially mushroom-shaped and which are arranged on the lamella 112 or are formed in one piece with this. The pins 124 are, for example, injection molded onto the lamella 112.

The upper deflector lip 114 thereby has pockets corresponding to the pins 124 in the form of receivers 126 into which the pins are inserted. As a consequence of the insertion, the pins 124 engage behind respective walls which limit the respective receivers 126 such that the deflector lip 114 is connected positively to the lamella 112.

Figure 24A:
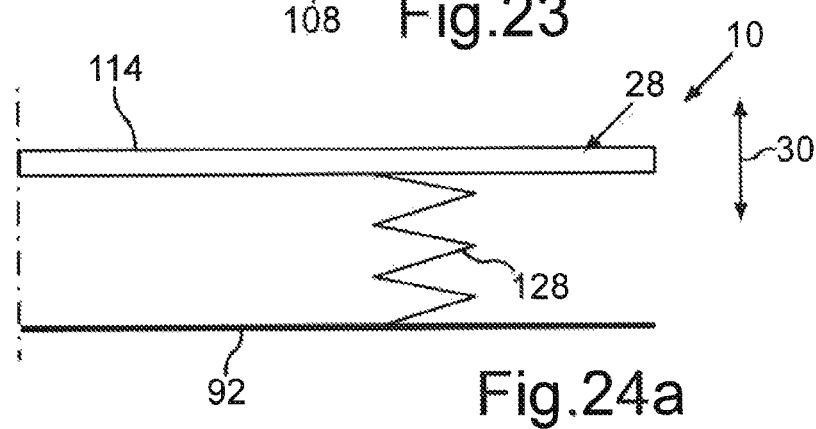
FIG. 24a is, in sections, a schematic depiction of the wind deflector according to a seventh embodiment.

FIG. 24a shows the wind deflector 10 according to a seventh embodiment. The deflector element 28 can thereby be formed as a deflector lip 114 or comprise at least one deflector 114 which can be connected to an, in particular, inherently rigid lamella which is not depicted in FIG. 24a for this overview, such as for example the lamella 112.

As is recognizable from FIG. 24a, the deflector element 28 is mounted on the housing lower part 92 via at least one spring element 128. Preferably, several spring elements 128 are provided for mounting. The respective spring element 128 can thereby be formed as a spiral or leaf spring such that a spiral spring or a symmetrical leaf spring is provided for mounting. The actuator 32 causing the linearly oscillating movement of the deflector element 28 is not depicted in FIG. 24a.

The respective spring element 128, in particular the respective leaf spring, can be fastened to the iron core 82 on the fixed side, in particular directly to the iron core 82 and directly to the coil body 86 on the moving side. The iron core 82 of the actuator 32 thereby serves the entire system as a dimensional reference. Due to its position and very high rigidity, it is particularly well suited as a reference system. Electrical current to supply the electrical coil of the actuator 32 is preferably conducted through the at least one spring element 128. Due to the fastening of the spring element 128 on the coil body 86, for example, a cable can be saved between the electrical coil and the spring element 128. Preferably, the spring elements 128 are arranged in parallel to the deflector element 28, in particular to the lamella 112, and if possible directly below the respective focus point thereof.

Figure 24B:
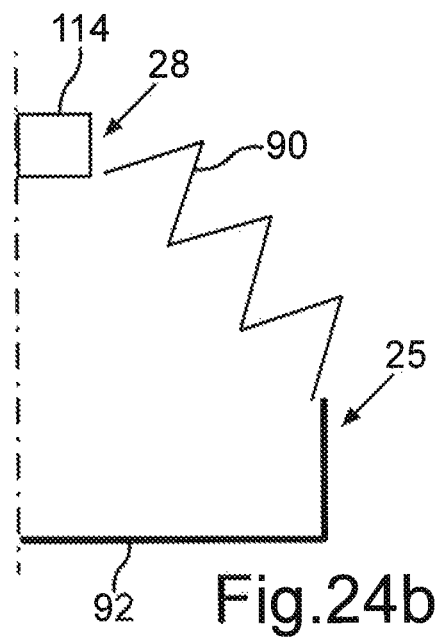
FIG. 24b is, in sections, a schematic depiction of the wind deflector according to an eighth embodiment.

FIG. 24b shows the wind deflector 10 according to an eighth embodiment. The deflector element 28, in particular the moveable deflector lip 114, is thereby mounted on the housing 25 via the flexible membrane 90, in particular on the housing element 26 and/or on the housing lower part 92.

A bellows, in particular an expansion bellows, is formed by the flexible membrane 90, which assumes both the function of mounting the deflector element 28 and the function of sealing of deflector element 28 against the housing 25. Due to the design of the flexible membrane 90 as an expansion bellows, the flexible membrane 90 can be moved particularly well with the deflector element 28 and therefore on the one hand can be connected firmly to the housing 25 and on the other hand can be connected firmly to the deflector element 28.

Figure 24C:
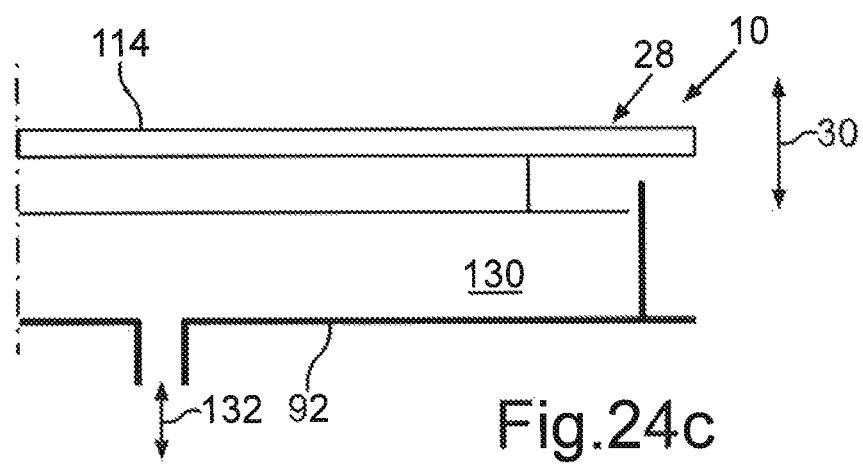
FIG. 24c is, in sections, a schematic depiction of the wind deflector according to a ninth embodiment.

FIG. 24c shows the wind deflector 10 according to a ninth embodiment. In the case of the ninth embodiment, a hydraulic or pneumatic drive is provided to cause the linearly oscillating movement of the deflector element 28. For this purpose, the deflector element 28 is coupled to a fluid volume 130. The fluid volume 130 can be increased or decreased by conveying the fluid, for example a gas or a liquid, by means of at least one pump. This is illustrated in FIG. 24c by a double arrow 132. The linearly oscillating movement of the deflector element 28 can be caused by the alternating increasing and decreasing of the fluid volume 130. By means of FIG. 24c, for example, a hydraulic or pneumatic drive of the deflector element 28 by means of exactly one drive or actuator is illustrated.

Figure 24D:
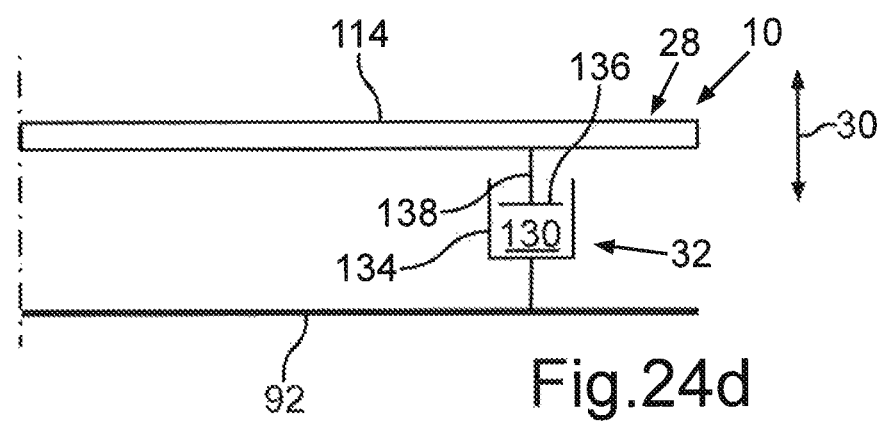
FIG. 24d is, in sections, a schematic depiction of the wind deflector according to a tenth embodiment.

FIG. 24d shows the wind deflector 10 according to a tenth embodiment. To cause the linearly oscillating movement, several actuators 32 or exactly one actuator 32 can be provided. The at least one actuator 32 can thereby be formed as a hydraulic, pneumatic or mechatronic drive or actuator.

As is recognizable from FIG. 24d, the actuator 32 comprises a cylinder 134 and a piston 136 which corresponds to this and which is received in the cylinder 134 and is able to move linearly relative to the cylinder 134. A piston rod 138 is coupled to the piston 136 which is connected at least directly to the deflector element 28. Linear movements of the piston 136 relative to the cylinder 134 can therefore be transferred to the deflector element 28 via the piston rod 138. Due to the mountings of the deflector element 28 on the housing 25 depicted by means of FIG. 24a to 24d, a mounting which is free of transverse force and is particularly low in friction can be achieved.

The cable 36, via which the actuator 32 is supplied with electrical current or with the fluid, preferably runs from the fixed side of the spring element 128 through the housing 25 to as far as possible into the end thereof. The outlet of the cable 36 occurs at or at least close to the pivot axis of the wind deflector 10 in order to prevent an excessively large alternating bending stress of the cable 36. This is particularly well recognizable from FIG. 1. Originating from this outlet, the cable 36 runs outside of the wind deflector 10 until back to a plug of the control device 34.

In other words, electrical current with which the electrical coil is supplied, is preferably transferred to the electrical coil via the spring element 128. For this purpose, the spring element 128 is fastened to the iron core 82 and at the same time is electrically contacted with the cable 36 for the transfer of the electrical current. On the other hand, the spring element 128 is fastened to the coil body 86, wherein it is electrically contacted at the same time with the electrical coil.

Preferably, it is provided that respective feed-throughs for the cable are sealed by means of at least one respective sealing element in order to prevent undesirable entry of moisture and water. Furthermore, corresponding cable channels can be provided in which the cable is arranged at least partially. These cable channels serve to guide the cable.

Figure 24E:
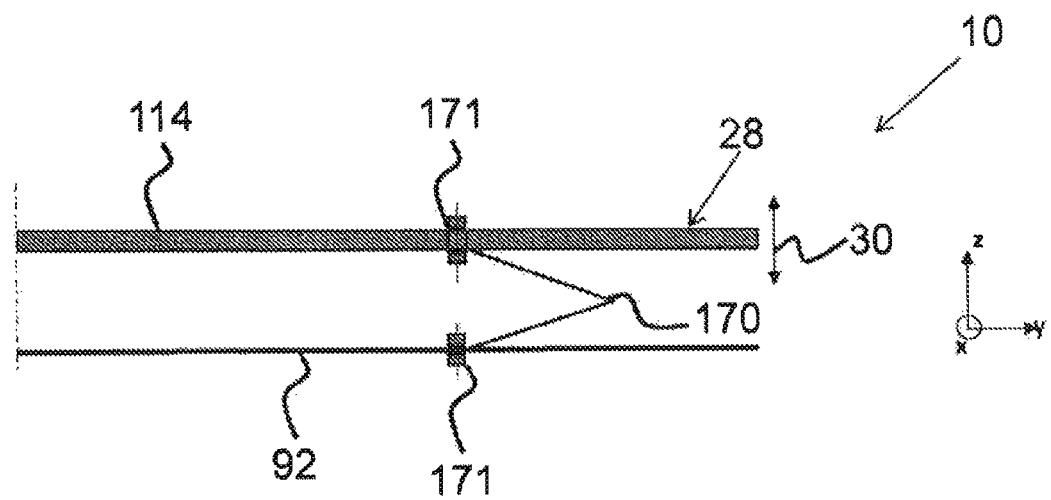
FIG. 24e is, in sections, a schematic depiction of a wind deflector in the longitudinal cut according to an eleventh embodiment.
Figure 24F:
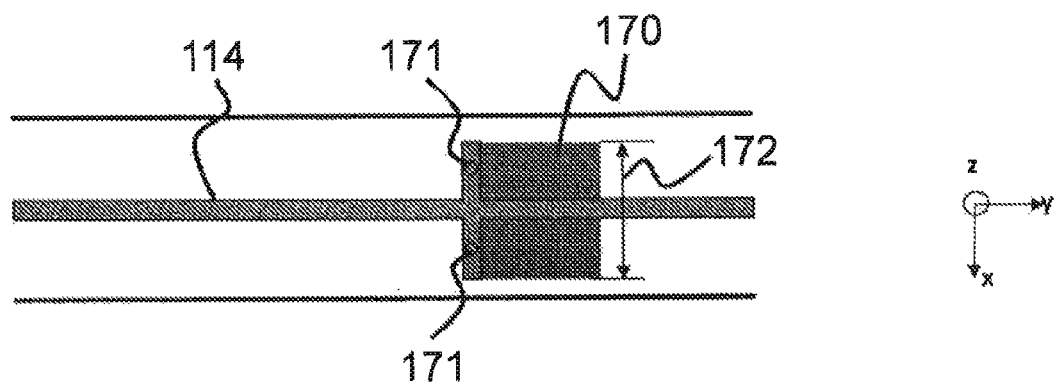
FIG. 24f illustrates the wind deflector according to FIG. 24e in a top view.

FIGS. 24e and 24f show the wind deflector 10 according to an eleventh embodiment in a longitudinal cut or a top view. It is recognizable from these that the deflector element 28 is mounted on the housing lower part 92 via at least one leaf spring 170. The actuator 32 causing the linearly oscillating movement of the deflector element 28 is not depicted here. The leaf spring 170 is fastened in each case to the deflector element 28 and to the housing lower part 92 by means of screw connections 171. The width of the leaf spring 170 is characterized in FIG. 24f by the arrow 172. Due to the symmetrical arrangement of the leaf spring 170 relative to the deflector element 28, no bending moment is initiated in the deflector lip 114 around the x-axis. Furthermore, bending moments around the y-axis are supported by the leaf spring 170 which is executed to be wide. The guide is thereby ensured in the x and y direction such that the guide pin depicted in FIG. 4a can be omitted, including the bushing on the drive or on the actuator.

The invention claimed is:

1. A wind deflector for a vehicle, comprising:
a housing element;
a deflector element which is at least partially received in the housing element;
an actuator, wherein the deflector element is movable in a linearly oscillating manner relative to the housing element in at least one spatial direction via the actuator; and
a sealing element, wherein the deflector element is sealed at least in a partial region against the housing element by the sealing element;
wherein the sealing element is a flexible membrane which is disposed on the housing element and on the deflector element such as to be moveable with the deflector element;
wherein the housing element is rigid and is formed from a first plastic and wherein the flexible membrane is formed from a second plastic which differs from the first plastic and is injection molded onto the housing element.

2. The wind deflector according to claim 1, wherein the deflector element is mounted on the housing element via the flexible membrane.

3. The wind deflector according to claim 1, wherein the flexible membrane and the deflector element are connected to each other.

4. The wind deflector according to claim 1, wherein a sealing lip is disposed on the housing element to seal the housing element against a structure of the vehicle.

5. A wind deflector for a vehicle, comprising:
a housing element;
a deflector element which is at least partially received in the housing element;
an actuator, wherein the deflector element is movable in a linearly oscillating manner relative to the housing element in at least one spatial direction via the actuator;
a sealing element, wherein the deflector element is sealed at least in a partial region against the housing element by the sealing element;
wherein the sealing element is a flexible membrane which is disposed on the housing element and on the deflector element such as to be moveable with the deflector element; and
a cover element formed from a first plastic, wherein the flexible membrane is formed from a second plastic which differs from the first plastic, wherein the flexible membrane is injection molded onto the cover element, and wherein the housing element is covered at least partially by the cover element arranged on the housing element.

6. A wind deflector for a vehicle, comprising:
a housing element;
a deflector element which is at least partially received in the housing element;
an actuator, wherein the deflector element is movable in a linearly oscillating manner relative to the housing element in at least one spatial direction via the actuator; and
a sealing element, wherein the deflector element is sealed at least in a partial region against the housing element by the sealing element;
wherein the sealing element is a flexible membrane which is disposed on the housing element and on the deflector element such as to be moveable with the deflector element;
wherein the deflector element includes a base body and a deflector lip which is formed separately from the base body and is connected to the base body and which is arranged above the base body in a vehicle vertical direction.

7. The wind deflector according to claim 6, wherein the base body and the deflector lip are formed from materials which differ from each other.

8. The wind deflector according to claim 6, wherein the flexible membrane is formed in one piece with the deflector lip.

* * * * *